INVENTORS
DONALD L. KLASS
VINCENT BROZOWSKI
BY
ATTORNEY

United States Patent Office 3,385,793
Patented May 28, 1968

3,385,793
ELECTROVISCOUS FLUID AND METHOD
OF USING SAME
Donald L. Klass, Barrington, and Vincent Brozowski,
Mundelein, Ill., assignors, by mesne assignments, to
Union Oil Company of California, Los Angeles, Calif.,
a corporation of California
Continuation-in-part of application Ser. No. 71,625,
Nov. 25, 1960. This application Mar. 19, 1965, Ser.
No. 458,802
11 Claims. (Cl. 252—75)

This application is a continuation-in-part of application Ser. No. 71,625, filed Nov. 25, 1960, now abandoned. This invention is directed to an alternating-electric-field chucking device, and to electric-field-sensitive fluid compositions for use with such devices.

It is known that certain fluids respond to the influence of electric potential by evidencing an apparent pronounced increase in bulk viscosity. Such fluids will hereinafter be referred to as electroviscous fluids. A number of such fluids are described in U.S. patents to Willis M. Winslow, 2,661,596, 2,661,825 and 3,047,507. Such fluids are useful in clutches, wherein the fluids are disposed between the surfaces of two electrically conductive members, and an electric potential is imposed across the two members. The fluid responds to the application of electric potential by instantaneously but reversibly changing in bulk viscosity. In strong fields the fluid apparently freezes into a solid or semi-solid condition, whereby torque can be transmitted through the fluid between the surfaces of the clutch members.

It is further known that certain electroviscous fluids exposed to an alternating electric field exhibit a similar change in bulk viscosity, even though the fluid is not in contact with the potential-carrying electrodes. This phenomenon is utilized in chucking devices, by means of which conductive objects can be secured in an electroviscous fluid film.

It has now been found that by incorporating a suitable quantity of finely divided, particulate, conductive material in the electroviscous fluid used with an alternating-field chucking device, non-metallic, non-conductive objects can be secured with the same efficiency with which conductive objects are held using known electroviscous fluids.

It becomes therefore an object of this invention to provide a novel electroviscous fluid by means of which objects can be secured to an alternating-field chucking device. Yet another object of this invention is to provide a novel electroviscous fluid by which non-conductive objects can be secured to alternating-field chucking devices. Still another object of this invention is to provide an alternating-field chucking arrangement by which non-conductive as well as conductive objects can be firmly and conveniently secured in place.

The invention is best described with reference to the drawings, of which:

Figure 1:
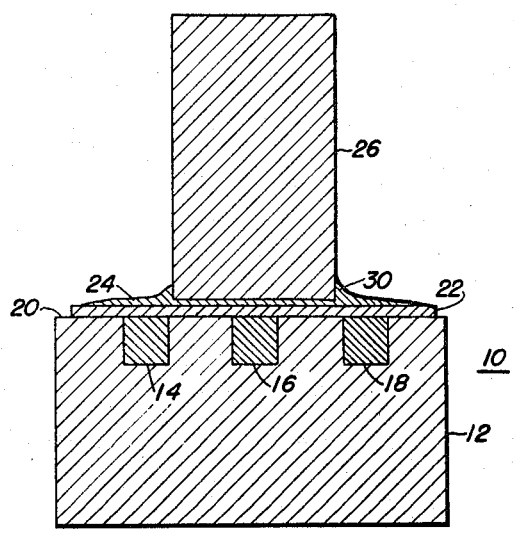
FIGURE 1 is an elevational view, in section, of an alternating-field chucking assembly in accordance with this invention.
Figure 2:
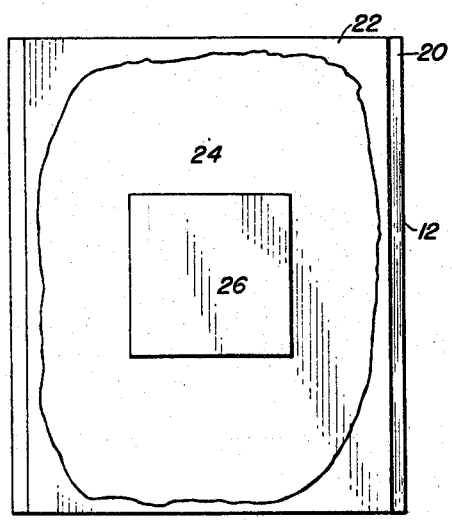
FIGURE 2 is a plan view of the assembly depicted in FIGURE 1.

Chuck 10 comprises a high-resistivity, low-dielectric-constant plastic base 12 formed of a thermoplastic or thermosetting resin, such as epoxy resins, urea-formaldehyde resins, polyethylene resins, polystyrene resins and polyvinylate resins. Imbedded in the base are three electrically conductive rods, 14, 16, and 18. The electrically conductive rods, which may be any number greater than one, are supported by base 12 in spaced, insulated relationship, and the flat upper surface 20 of the rods and base are coated with a thin layer or film 22 of a high-resistivity, high-dielectric-constant solid material, such as barium titanate. Spread upon dielectric layer 22 is film 24 of electroviscous fluid. Supported in this film is a rectangular prismatic object 26. The secured object 26 may be of any desired shape provided that it has at least one surface of sufficient uniformity to provide effective contact with fluid film 24.

The alternating-field chucking device is energized by applying electrical potential, preferably multiphase, of moderate frequencies in excess of 60 cycles per second, and of a voltage in the range of 100 to 10,000 volts. One phase is connected to each of the conducting rods. Before the application of electrical potential, the electroviscous fluid film, which may have a viscosity in the range of 2 to 100 centipoises, is readily deformable by the placing thereon of an object such as object 26. As the object settles into the electroviscous fluid film, some of the displaced fluid generally forms a fillet 30 around the object. The object remains separated from the dielectric layer by a relatively thin layer of electroviscous fluid. If the object 26 is conductive, upon the application of a multiphase electrical potential the electroviscous fluid between the object and the dielectric layer 22 thickens, but the electroviscous fluid removed even a short distance from the object remains fluid. The object is secured by the film to the dielectric layer so as to resist perpendicular movement from the dielectric layer, and to resist to a much greater extent parallel movement with respect to the dielectric layer.

It has now been found that when a quantity of conductive material is incorporated in the electroviscous fluid, upon application of the electric potential the entire electroviscous fluid film thickens, and this response to the applied potential occurs irrespective of whether the object secured is conductive or non-conductive. Thus it is apparent that by use of the novel electroviscous fluid of this invention, non-conductive non-metallic objects can be secured by means of alternating-field chucking devices.

In general, the electroviscous fluid compositions of this invention may be made by incorporating in a conventional, alternating-field-sensitive electroviscous fluid a quantity of particulate conductive metal in the range of about 1% to 40% by weight. Additional quantities of metal may be added, but with no increase in effectiveness of the resulting fluid. In general, quantities of conductive metal in the range of 10% to 20% by weight are found to produce electroviscous fluids of optimum holding power. The metal may be magnetic or non-magnetic. Metals such as copper, iron, aluminum, zinc, bronze, and lead may be used. Of these, copper is especially preferred because of its high conductivity. The metal particles should not be larger than about 30 microns in size, so that they can be retained readily as a dispersed phase in the electroviscous fluid. Where very thick electroviscous fluids, approaching the consistency of a grease, are employed, larger metal particles may be used. Where the electroviscous fluid is of a relatively low viscosity, metallic particles having a size of about 5 to 10 microns are preferred.

While prior art electroviscous fluid compositions, such as those discussed by Winslow in the aforementioned patents, may be used as the base stock to which particulate metal is added to form the conductive electroviscous fluids of this invention, the effective holding power of the resulting electroviscous fluids will vary widely depending upon the composition of the electroviscous fluid base stock employed. It has been found that conductive electroviscous fluids of outstanding holding power can be formulated as follows.

Example I

To an electroviscous fluid base stock consisting essentially of:

| | Percent |
|---|---|
| White oil vehicle | 30 |
| Silica | 50 |
| Ethylene glycol | 5 |
| 1 - hydroxyethyl - 2 - heptadecenyl - imidazoline | 13.5 |
| N - aminoethyl ethanolamine | 1.5 | is added 20% by weight of particulate copper having an average particle size of 20 microns and a size range of 15 to 30 microns. The white oil acts as an electroviscous fluid vehicle, and should be a highly refined oil. The silica particles should be of a size range such that they can be kept in a dispersed condition by the 1 - hydroxyethyl - 2-heptadecenyl - imidazoline which acts as a dispersing agent. The N - aminoethyl ethanolamine is additionally effective in conjunction with the 1 - hydroxyethyl - 2-heptadecenyl - imidazoline for maintaining the silica in suspension. Silica particles of a size not greater than 10 microns are preferred. The ethylene glycol serves as an activator for the electroviscous fluid and greatly enhances the efficiency and holding power of the fluid.

Example II

A conductive electroviscous fluid of outstanding holding power was formulated by adding to the base stock of Example I 5% by weight of glycerol monooleate, and 40% by weight of copper powder having an average particle size of less than 30 microns.

Example III

A conductive electroviscous fluid is formulated from a base stock consisting essentially of

| | Percent |
|---|---|
| Silicone fluid (Dow Corning 510) | 30 |
| Silica | 50 |
| 1 - hydroxyethyl - 2 - heptadecenyl - imidazoline | 9 |
| N - aminoethyl ethanolamine | 1 |
| Ethylene glycol | 5 |
| Glycerol monooleate | 5 | by adding thereto 15% by weight of finely divided iron having an average particle size of 20 microns. In this composition the silicone fluid is employed as the fluid vehicle in place of the white oil used in Examples I and II.

Conductive electroviscous fluid compositions in accordance with this invention may be formulated using as the vehicle any high-resistivity oleaginous vehicle having a dielectric constant not greater than ten and preferable in the range of 2 to 5. Hydrocarbon liquids such as highly refined mineral oil fractions having a high resistivity, such as white oils, are preferred. Di-ester fluids such as dibutyl sebacate and di - 2 - ethylhexyl adipate may be used as the fluid vehicle. Synthetic oils resulting from polymerization of unsaturated hydrocarbons, polyfluoro derivatives and fluorinated hydrocarbons within the lubricating oil viscosity range are also useful vehicles. Preferably the vehicle is one which is only weakly absorbed by the silica or other particulate solid.

A wide number of oil-soluble surface-active agents are available which may be used as the dispersant to maintain the silica gel or other force imparting particulate solid in suspension and/or to activate it. Suitable dispersants are fatty acid-amine salts, soaps, fatty amines, glycerol and glycol esters, ethoxylated fatty alcohols and acids, epoxide polymers and copolymers, alkanolamides, and phenol-epoxide adducts. Especially preferred is the combination of 1 - hydroxyethyl - 2 - heptadecenyl - imidazoline with N - aminoethyl ethanolamine which is sold in 90%/10% mixture under the name Amine 220. Glycerol monooleate is effective as a dispersant and activator. A variety of polar materials, including water, may be used to activate the electroviscous fluid. Lower hydroxy-substituted hydrocarbons have been found to be highly efficient. Especially preferred are the aliphatic polyhydroxy-substituted hydrocarbons, such as ethylene glycol.

While silica gel or estersils having a surface area to weight ratio of about 0.5 square meter or more per gram of the silica or estersil and an average particle size of about 0.04 to 10 microns diameter, is preferred as the particulate solid dispersed in the vehicle to significantly increase the A.C. force characteristics or the holding power of the electroviscous fluid, other essentially non-conductive solids in finely divided powdered form which are useful are aluminum octoate, oleate and stearate; polystyrene carboxylic acid polymers; barium titanate; calcium stearate; activated charcoal; colloidal clay; crystalline D-sorbitol; dimethyl hydantoin resin; flint quartz; lauryl pyridinium chloride; lead oxide; lithium stearate; magnesium silicate; mannitol; microcel - C; micronized mica; nylon powder; onyx quartz; rottonstone; and zinc stearate. When using silica gel we prefer gels having six to eight silica-bonded hydroxyl groups per square millimicron of surface area and from zero to not more than four molecules per square millimicron of surface area, of free water (physically absorbed water). When using estersils we prefer those containing not less than two silica-bonded hydroxyl groups and about 0.5 to 1.5 silicon-bonded ester groups per square millimicron of surface area. Estersils useful in preparing electroviscous fluid are prepared by reacting silica containing not less than 2.5 silica-bonded hydroxyl groups, and preferably at least 6, per square millimicron of surface area with a polyhydroxy substituted ester or polyhydroxy alcohol having a molecular weight in the range of about 130 to 400, such as those disclosed in copending application Ser. No. 248,227.

The quantities of the base stock constituents may be varied, although definite proportions giving optimum holding power will exist for most fluid systems. In general, the fluid vehicle should make up 25 to 35 percent by weight of the base stock, i.e., the electroviscous fluid prior to addition of the conductive metal. The remainder may be silica, 30 to 55 percent by weight; dispersing agent or agents, 10 to 20 percent by weight; and activator, 2 to 10 percent by weight. To such a base stock is added 1 to 40 percent of a conductive metal, based on the weight of the aforenamed base stock.

As used in the appended claims, the term "alternating-field-sensitive-fluids" is defined to mean any electroviscous fluid exhibiting an apparent change in bulk viscosity under the influence of an alternating electric field, when the electrodes by which the field is applied are not in contact with the liquid. Examples of such alternating-field-sensitive fluids are the electroviscous fluid base stocks of the foregoing specific examples, as well as A.C. sensitive electroviscous fluids of the prior art, as exemplified by the aforenamed patents to Willis M. Winslow. Such fluids will comprise as essential constituents, a high-resistivity liquid vehicle such as a hydrocarbon oil; a dispersed particulate essentially non-conductive solid capable of significantly increasing the holding power of such vehicle when subjecting to an electric field such as silica; and a dispersant and activator, such as glycerol monooleate.

We claim:

1. A field-sensitive chucking fluid consisting essentially of about 30% by weight of white oil, about 50% by weight of silica having a particle size less than about 10 microns, about 5% by weight of ethylene glycol, and about 13.5% by weight of 1-hydroxyethyl-2-heptadecenyl-imidazoline, to which is added 1 to 40% by weight based on the weight of the aforenamed components of a particulate conductive metal having a particle size of less than about 30 microns.

2. A fluid in accordance with claim 1 in which is incorporated about 1.5% by weight of N-aminoethyl ethanolamine.

3. A fluid in accordance with claim 2 to which is added about 4% by weight glycerol monooleate.

4. A fluid in accordance with claim 3 in which said metal is copper.

5. An alternating-field-sensitive chucking fluid consisting essentially of a high-resistivity, oleaginous, hydrocarbon vehicle, about 30 to 50% by weight of particulate silica having a particle size less than about 10 microns, and about 10 to 20% by weight of glycerol monooleate; to which is added about 1 to 40% by weight based on the weight of the aforenamed components of a particulate conductive metal having a particle size of less than about 30 microns.

6. An alternating-field-sensitive electroviscous fluid consisting essentially of a high oleaginous liquid containing an amount of dispersed particulate essentially non-conductive solid sufficient to increase the holding power of the liquid when subjected to an electric field, an oil-soluble surface-active agent in an amount sufficient to maintain said solid dispersed in the liquid and about 1 to 40% by weight based on the total weight of the preceding components of dispersed particulate conductive metal having an average particle size not in excess of about 30 microns.

7. An electroviscous fluid in accordance with claim 6 in which the non-conductive solid is silica.

8. An electroviscous fluid in accordance with claim 7 in which the conductive metal is copper.

9. The method of holding an electrically non-conducting work piece stationary when force is applied thereto which comprises spreading a thin layer of an alternating current-responsive electroviscous fluid consisting essentially of a high resistivity oleaginous liquid containing an amount of dispersed particulate essentially non-conductive solid sufficient to increase the holding power of the liquid when subjected to an electric field, an oil-soluble surface-active agent in an amount sufficient to maintain said solid dispersed in the liquid and containing about 1 to 40% by weight of particulate conductive metal having an average particle size not in excess of about 30 microns on the surface of a chuck, placing said work piece on said chuck in contact with said fluid, and applying alternating current to said chuck by means of a plurality of conductors insulated from each other and from said fluid by a thin layer of high resistivity material.

10. Method in accordance with claim 9 in which the conductive metal is copper.

11. The method in accordance with claim 9 in which said electroviscous fluid consists essentially of a high-resistivity, oleaginous, hydrocarbon liquid; about 30 to 50% by weight of particulate silica having a particle size less than about 10 microns; about 10 to 20% by weight of glycerol monooleate; and about 1 to 40% by weight, based on the weight of the aforenamed components of said particulate conductive metal.

References Cited

UNITED STATES PATENTS 2,886,151   5/1959   Winslow  _____ 252—75
3,047,507   7/1962   Winslow  _____ 252—75

LEON D. ROSDOL, *Primary Examiner.*

S. D. SCHWARTZ, R. D. LOVERING,
*Assistant Examiners.*